US011233942B2

(12) United States Patent
Uesugi (10) Patent No.: US 11,233,942 B2
(45) Date of Patent: Jan. 25, 2022

(54) IMAGE CAPTURING APPARATUS, METHOD OF CONTROLLING THE SAME AND STORAGE MEDIUM

(71) Applicant: CANON KABUSHIKI KAISHA, Tokyo (JP)

(72) Inventor: Tomomi Uesugi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/828,341

(22) Filed: Mar. 24, 2020

(65) Prior Publication Data

US 2020/0314339 A1    Oct. 1, 2020

(30) Foreign Application Priority Data

Mar. 25, 2019 (JP) .............................. JP2019-057087

(51) Int. Cl.
*H04N 5/232* (2006.01)

(52) U.S. Cl.
CPC ..... *H04N 5/23254* (2013.01); *H04N 5/23258* (2013.01)

(58) Field of Classification Search
CPC .................. H04N 5/23254; H04N 5/23258
See application file for complete search history.

(56) References Cited

U.S. PATENT DOCUMENTS

2012/0092511 A1* 4/2012 Wakamatsu ......... G02B 27/646
348/208.2

FOREIGN PATENT DOCUMENTS

JP    2012-088466 A    5/2012

* cited by examiner

*Primary Examiner* — Twyler L Haskins
*Assistant Examiner* — Fayez A Bhuiyan
(74) *Attorney, Agent, or Firm* — Cowan, Liebowitz & Latman, P.C.

(57) ABSTRACT

An image capturing apparatus comprises a first shake detection unit configured to detect a translation component of a shake in a first axial direction; a second shake detection unit configured to detect a rotational component of a shake about a second axis; a third shake detection unit configured to detect a rotational component of a shake about a third axis; a first acquisition unit configured to acquire a first shake correction amount from an output signals of the first and second shake detection units, and acquire a second shake correction amount from an output signals of the first and third shake detection units; and a second acquisition unit configured to calculate a translational shake amount in the first axial direction using the first shake correction amount and the second shake correction amount.

22 Claims, 5 Drawing Sheets

IMAGE CAPTURING APPARATUS, METHOD OF CONTROLLING THE SAME AND STORAGE MEDIUM

BACKGROUND OF THE INVENTION

Field of the Invention

The present invention relates to a technique for suppressing image deterioration by correcting image blurring caused by camera shake or the like in an image capturing apparatus.

Description of the Related Art

Current cameras are fully automated for important image capturing tasks, such as exposure determination and focusing, and users who are not familiar with operation are very unlikely to fail at image capturing. In addition, in order to prevent image blur due to camera shake or the like, in a camera provided with an image blur correction apparatus including a shake detection unit, a shake correction unit, or the like, there is almost no cause for inducing a user's image capturing error.

Here, image blur correction apparatuses will be briefly described. In order to enable image capturing without image blurring even if camera shake occurs at the time of shutter release, it is necessary to detect rotational shake and translational shake of the camera due to camera shake and move a shake correction lens in accordance with the detection values.

In a general capturing scene, the influence of the rotational shake is dominant, and techniques for reducing the influence of the rotational shake have improved. Especially, in recent years, it has become possible to detect rotational shake over a wider frequency band than before, particularly in low frequency bands, by improving the performance of an angular velocity sensor. By utilizing this, correction performance of the camera for rotational shake is improved, and it becomes possible to perform temporally longer image capturing. On the other hand, in the case of longer image capturing, the influence of translational shake, which had not been a problem much in the past, becomes noticeable in some cases.

As a method for correcting translational shake, Japanese Patent Laid-Open No. 2012-88466 discloses a technique for obtaining translational shake from a ratio of output of an accelerometer and output of an angular velocity meter, and driving a shake correction unit.

Japanese Patent Laid-Open No. 2012-88466 is based on the assumption that a camera is rotated about one rotational axis in the calculation of the translational shake. This is an assumption that, when the motion of the human body is observed within the limited exposure time of the camera, the motion is performed in a certain frequency band (1 to 10 Hz) around one rotation center.

However, as described above, when image capturing is performed at a longer exposure time, a large translational shake at a lower frequency (slow) has an effect on the image. In addition, there is a characteristic that the dominant frequency band differs for each rotational axis of the camera. There is a problem in that if a frequency which is not dominant is not removed, a component which is not an original translational shake may also be detected.

SUMMARY OF THE INVENTION

The present invention has been made in view of the above-mentioned problems, and improves the accuracy of detecting translational shake in an image capturing apparatus.

According to a first aspect of the present invention, there is provided an image capturing apparatus comprising: at least one processor or circuit configured to function as a first shake detection unit configured to detect a translation component of a shake in a first axial direction; a second shake detection unit configured to detect a rotational component of a shake about a second axis perpendicular to the first axis; a third shake detection unit configured to detect a rotational component of a shake about a third axis perpendicular to the first axis and the second axis; a first acquisition unit configured to acquire a first shake correction amount based on a signal in a first frequency band from an output signal of the first shake detection unit and an output signal of the second shake detection unit, and acquire a second shake correction amount based on a signal in a second frequency band from an output signal of the first shake detection unit and an output signal of the third shake detection unit; and a second acquisition unit configured to acquire a translational shake amount in the first axial direction using the first shake correction amount and the second shake correction amount.

According to a second aspect of the present invention, there is provided a control method of an image capturing apparatus, comprising: performing a first shake detection of detecting a translation component of a shake in a first axial direction; performing a second shake detection of detecting a rotational component of a shake about a second axis perpendicular to the first axis; performing a third shake detection of detecting a rotational component of a shake about a third axis perpendicular to the first axis and the second axis; performing a first acquisition of acquiring a first shake correction amount based on a signal in a first frequency band from an output signal of the first shake detection and an output signal of the second shake detection, and acquiring a second shake correction amount based on a signal in a second frequency band from an output signal of the first shake detection and an output signal of the third shake detection; and performing a second acquisition of acquiring a translational shake amount in the first axial direction using the first shake correction amount and the second shake correction amount.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Figure 1A:
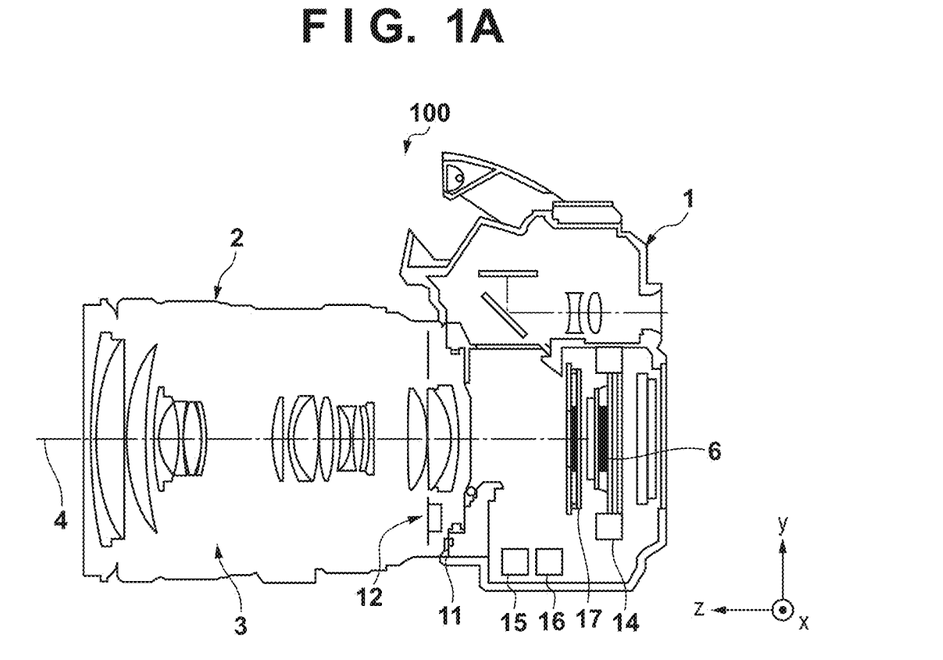
FIGS. 1A and 1B are diagrams showing a configuration of a single-lens reflex type digital camera 100 with interchangeable lenses, which is an embodiment of an image capturing apparatus of the present invention.
Figure 1B:
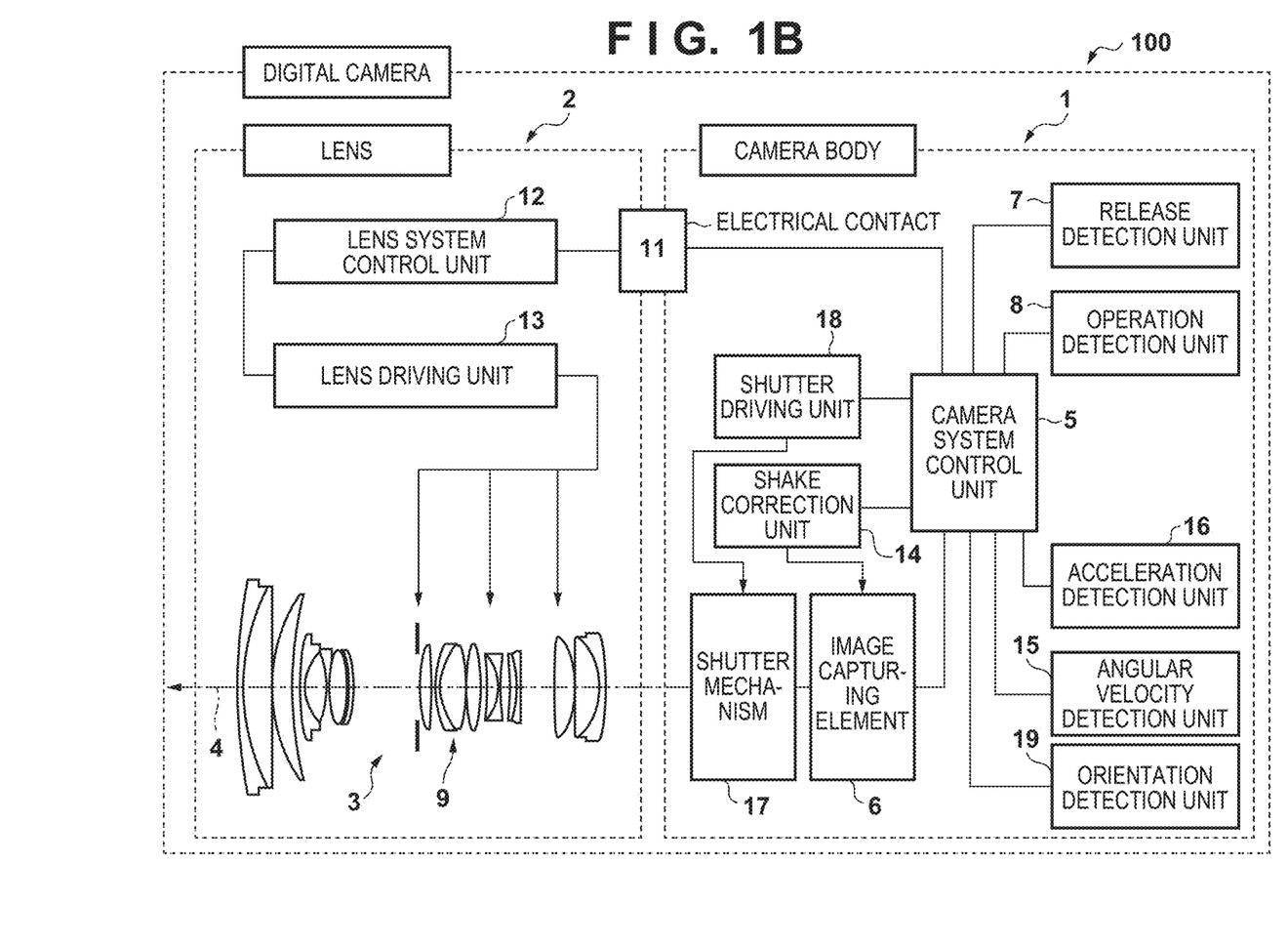

FIGS. 1A and 1B are diagrams showing a configuration of a single-lens reflex type digital camera 100 with interchangeable lenses, which is an embodiment of an image capturing apparatus of the present invention. FIG. 1A is a central cross-sectional view of the digital camera 100 according to one embodiment, and FIG. 1B is a block diagram showing an electrical configuration of the digital camera 100.

In FIG. 1A, the digital camera 100 includes a camera body 1 and a lens 2 detachably mounted on the camera body 1. The lens 2 includes an image capturing optical system 3 composed of a plurality of lenses having an optical axis 4 as an axis. The lens 2 is provided with a lens driving unit 13 so that the light flux from the subject that has passed through the lens 2 can be satisfactorily imaged on an image capturing element 6 of the camera body 1. The lens driving unit 13 receives a control signal from a lens system control unit 12 and drives the image capturing optical system 3. The image capturing optical system 3 includes a focus adjustment unit, an aperture driving unit, an image shake correction lens 9, and the like.

In the camera body 1, a shutter mechanism 17 is driven and controlled by a shutter driving unit 18 so that exposure is performed over an image capturing time set by the user or determined by a camera system control unit 5. The camera system control unit 5 calculates a shake correction amount for reducing the influence of shake based on signals output from a release detection unit 7, an operation detection unit 8, an acceleration detection unit 16, and an angular velocity detection unit 15, and outputs the shake correction amount to a shake correction unit 14 and the lens system control unit 12. The operation detection unit 8 detects a user's operation such as setting of a shutter speed, an F value, and a height (image capturing condition).

The shake correction unit 14 drives the image capturing element 6 so that its position moves in a plane perpendicular to the optical axis 4 based on the shake correction amount received from the camera system control unit 5. The camera body 1 is provided with the release detection unit 7, the release detection unit 7 detects the opening and closing signal of the release switch (not shown), and sends the detected opening and closing signal to the camera system control unit 5. There are two types of open/close signals detected by the release detection unit 7. Specifically, the release detection unit 7 can detect two-step switches; a switch SW1 that is turned on by pressing the release button halfway and a switch SW2 that is turned on by pressing the release button all the way. An orientation detection unit 19 detects the orientation of the digital camera 100.

In FIG. 1A, the z-axis is an axis that is parallel to the optical axis 4. The x-axis and the y-axis are orthogonal to the z-axis and parallel to respective sides of the image capturing element 6. In addition, although the origin shown outside the digital camera 100 in FIGS. 1A and 1B and FIGS. 2A-2C for the sake of clarity, the origin is actually positioned at the center of the digital camera 100.

The lens system control unit 12 outputs a command based on the shake correction amount to the lens driving unit 13. The lens driving unit 13 drives the image shake correction lens 9 in the x direction and the y direction in FIG. 1A, and performs shake correction in consideration of both rotational shake and translational shake. The shake correction unit 14 drives the image capturing element 6 in the x direction and the y direction in FIG. 1A, and performs shake correction in consideration of both rotational shake and translational shake. The shake correction unit 14 performs shake correction in consideration of both the rotational shake and the translational shake caused by the rotational motion about the z-axis by also rotationally driving the image capturing element 6 about the z-axis. Correction based on the shake correction amount received from the camera system control unit 5 is not limited to this method, and other forms may be used. For example, there is a method of using so-called electronic image blur correction in which the effect of shake is reduced by changing the cut out position of each captured frame generated by the image capturing element 6. In addition, a correction method in which these are appropriately combined may be used.

Here, features of camera shake due to the user holding the digital camera 100 will be described with reference to FIGS. 2A-2C.

When framing with the digital camera 100, the human body can be treated as one rotational axis about which the rotational motion occurs. Since a person is holding the digital camera 100, the digital camera 100 is affected by the rotational motion of the human body and rotates together with the rotational motion human body. Consider the motion of the digital camera 100 at this time. Considering the motion of the digital camera 100 with respect to the center of the image capturing element 6, it can be regarded as a combination of a rotational motion centered at the image capturing element 6 (rotational component) and a translational motion (translation component). A translational shake of the digital camera 100 is corrected by utilizing the relationship between the rotational motion centered at the image capturing element 6 and the translational motion of the digital camera 100.

Consider the translational shake of the digital camera 100 caused by the rotational motion about a joint of the human body or the like. As described above, when framing with the digital camera 100, the human body can be treated as one rotational axis about which the rotational motion occurs. This rotational motion can be considered to be a main factor of the translational motion of the digital camera 100. Therefore, when obtaining the translational shake, the calculation is performed using the assumption that the human body is rotating about one rotational axis. In the rotational motion of the human body, a joint or the like may the main rotational axis. In addition, although a joint often serves as a rotational axis, there are cases in which a joint performs rotational motion with a rotational axis outside of the body. This is because each part of the human body moves like parallel links.

Figure 2A:
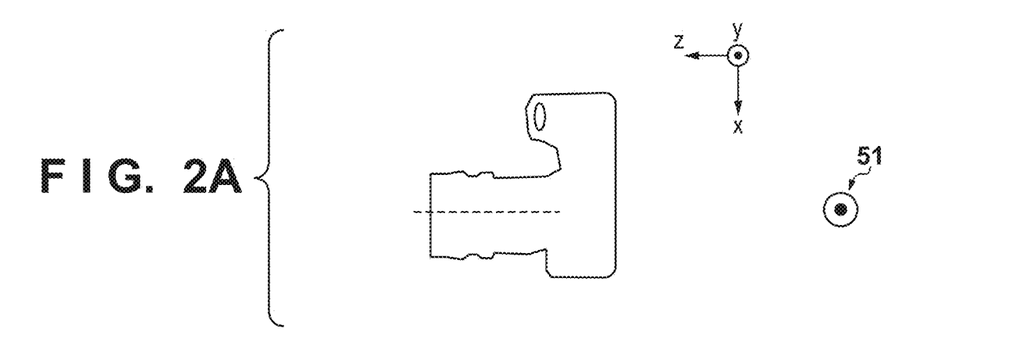
FIGS. 2A-2C are views of the digital camera 100 viewed from each axial direction.

FIG. 2A is a view of the digital camera 100 as viewed from the y-axis +direction. An axis 51 is an axis parallel to the y-axis of the digital camera 100, and is an example of a rotational axis about which the y-axis of the digital camera 100 rotates. The motion of the digital camera 100 is represented by a rotational motion about the axis 51. The axis 51 may be the center of a human body or an arm of a human body. Also, a joint or the like may be the axis. For example, the axis may be the front or the rear of the human body. The translational shake of the image capturing element 6 is calculated from a shake caused in the digital camera 100 by the rotational motion about the axis 51.

Figure 2B:
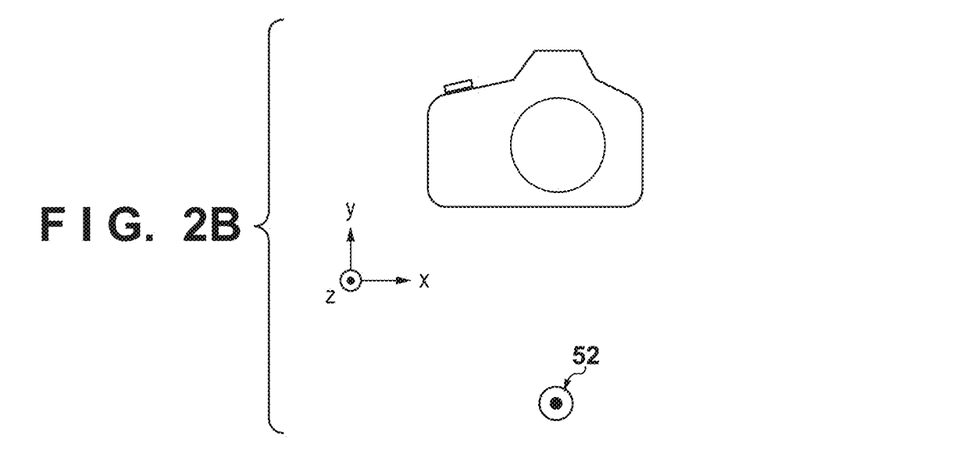

FIG. 2B is a view of the digital camera 100 as viewed from the z-axis +direction. An axis 52 is an axis parallel to the z-axis of the digital camera 100, and is an example of a rotational axis about which the z-axis of the digital camera 100 rotates.

The motion of the digital camera 100 is represented by a rotational motion about the axis 52. The axis 52 may be the waist of a human body or a foot of a human body. As described above, a joint or the like may also be the axis. For example, the axis 52 may be external to a human body below the foot or may be an arm of a human body. The translational shake of the image capturing element 6 is calculated from a shake caused in the digital camera 100 by the rotational motion about the axis 52.

Figure 2C:
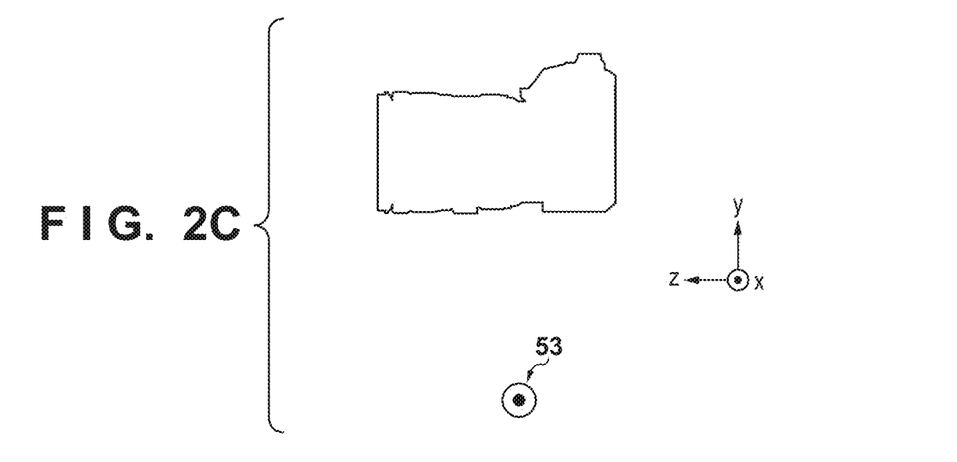

FIG. 2C is a view of the digital camera 100 as viewed from the x-axis +direction. An axis 53 is an axis parallel to the x-axis of the digital camera 100, and is an example of a rotational axis about which the x-axis of the digital camera 100 rotates.

The motion of the digital camera 100 is represented by a rotational motion about the axis 53. The axis 53 may be a waist of a human body or a foot of a human body. As described above, a joint or the like may also be the axis. For example, the axis 53 may be external to a human body below the foot or may be an arm of a human body. The translational shake of the image capturing element 6 is calculated from a shake caused in the digital camera 100 by the rotational motion about the axis 53.

Rotational motion about the axes 51 to 53 of the digital camera 100 can be decomposed into rotational motion about the y-axis, z-axis, and x-axis and translational motion in x, y, and z directions. The rotational motion of the digital camera 100 about the axis 51 can be decomposed into a rotational motion of the image capturing apparatus about the y-axis, a translational motion of the digital camera 100 in the x-axis direction, and a translational motion of the digital camera 100 in the z-axis direction. The rotational motion of the digital camera 100 about the axis 52 can be decomposed into a rotational motion of the image capturing apparatus about the z-axis, a translational motion of the digital camera 100 in the x-axis direction, and a translational motion of the digital camera 100 in the y-axis direction. The rotational motion of the digital camera 100 about the axis 53 can be decomposed into a rotational motion of the image capturing apparatus about the x-axis, a translational motion of the digital camera 100 in the y-axis direction, and a translational motion of the digital camera 100 in the z-axis direction.

The translational shake in the x-axis direction of the digital camera 100 is obtained by adding the shake due to translational motion in the x-axis direction caused by rotational motion of the digital camera 100 about the axis 51 and the shake due to translational motion in the x-axis direction due to rotational motion of the digital camera 100 about the axis 52.

Also, the translational shake in the y-axis direction of the digital camera 100 is obtained by adding the shake due to translational motion in the y-axis direction caused by rotational motion of the digital camera 100 about the axis 52 and the shake due to translational motion in the y-axis direction due to rotational motion of the digital camera 100 about the axis 53.

Also, the translational shake in the z-axis direction of the digital camera 100 is obtained by adding the shake due to translational motion in the z-axis direction due to rotational motion of the digital camera 100 about the axis 51 and the shake due to translational motion in the z-axis direction due to rotational motion of the digital camera 100 about the axis 53.

The rotational motion about the axis 51, the rotational motion about the axis 52, and the rotational motion about the axis 53 have a characteristic that the dominant frequency band affecting the translational shake is different. For example, in rotational motion around the axis 52 and the axis 53, since the motion is like that of an inverted pendulum with respect to the feet, the rotational motion with a low frequency mainly affects translational shake. Since the rotational motion around the axis 51 is a motion in which the human body twists, unlike the rotational motion around the axis 52 and the axis 53, a rotational motion having a higher frequency than the motion with respect to the feet mainly affects translational shake.

Figure 3:
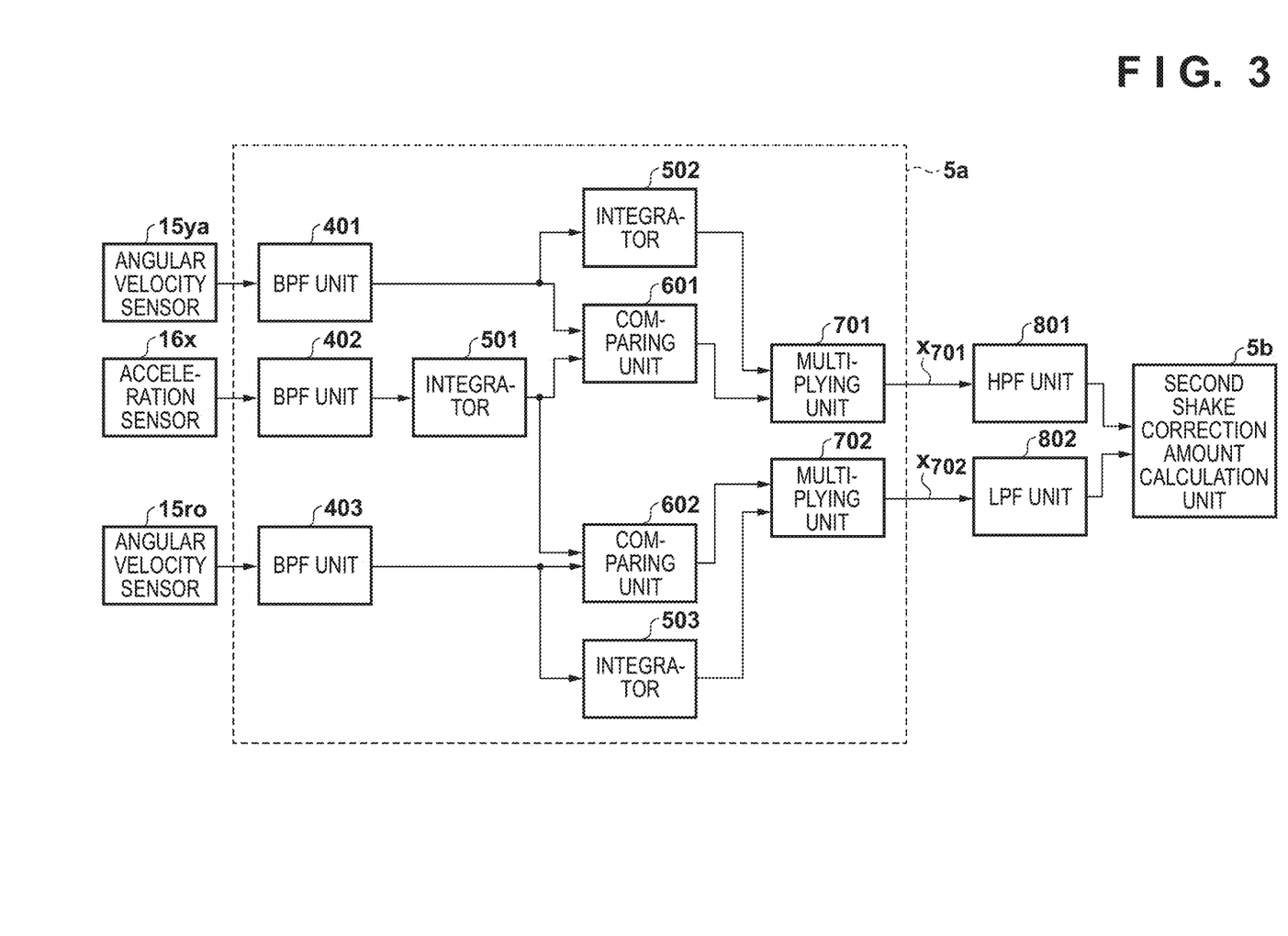
FIG. 3 is a block diagram showing a configuration of a shake correction amount calculation unit.

FIG. 3 is a block diagram showing a configuration of a first shake correction amount calculation unit 5a in the camera system control unit 5 for calculating the shake correction amount. The acceleration detection unit 16 in FIG. 3 is the acceleration detection unit 16 shown in FIG. B. and detects acceleration, which translation components in the x-axis direction, the y-axis direction, and the z-axis direction of FIG. 1A. The angular velocity detection unit 15 of FIG. 3 is the angular velocity detection unit 15 shown in FIG. 1B, and detects an angular velocity which is an angular velocity around the x-axis, an angular velocity around the y-axis, and a rotational component around the z-axis. Note that in FIG. 3, only the configuration of the shake occurring in the x-axis direction of the digital camera 100 is shown. The configuration for shake occurring in the y-axis direction and the z-axis direction is omitted, but is the same as the configuration for shake occurring in the x-axis direction.

In FIG. 3, an angular velocity sensor 15ya detects an angular velocity around the y-axis. An acceleration sensor 16x detects acceleration in the x-axis direction. An angular velocity sensor 15ro detects an angular velocity around the z-axis. The first shake correction amount calculation unit 5a receives, as input signals, output signals from the angular velocity sensor 15ya, the acceleration sensor 16x, and the angular velocity sensor 15ro. A first shake correction amount $x_{701}$ and a second shake correction amount $x_{702}$ are calculated and outputted, respectively. The first shake correction amount calculation unit 5a includes BPF units 401 to 403, integrators 501 to 503, comparing units 601 and 602, and multiplying units 701 and 702.

The BPF units 401 to 403 are band-pass filters for allowing only a specific band to pass. The BPF units 401 to 403 receive, as input signals, output signals from the angular velocity sensor 15ya, the acceleration sensor 16x, and the angular velocity sensor 15ro respectively. The BPF units 401 to 403 extract only a specific band from the input signal and output the extracted band. The BPF units 401 to 403 extract a signal of 0.01 Hz to 10 Hz which is a camera shake band. These BPF units are provided for the purpose of removing noise components. If there is little or no noise component, the BPF units 401 to 403 are unnecessary.

The integrator 501 receives a signal that has passed through a BPF unit as an input signal. The integrator 501 integrates and outputs the input signal. Here, the acceleration is integrated to output a velocity signal. The comparing unit 601 receives the output signal of the BPF unit 401 and the output signal of the integrator 501 as input signals, and calculates a first coefficient by dividing the output signal of the integrator 501 by the output signal of the BPF unit 401. The comparing unit 602 receives the output signal of the BPF unit 403 and the output signal of the integrator 501 as input signals, and calculates a second coefficient by dividing the output signal of the integrator 501 by the output signal of the BPF unit 403.

The first coefficient and the second coefficient correspond to the distance from the rotational axis to the image capturing element 6, i.e., the rotation radius, when the digital camera 100 is assumed to rotate. The equation of the calculation performed by the comparing unit 601 and the comparing unit 602 is as follows.

$$r_{601} = v_{402}/\omega_{401} \quad (12)$$

$$r_{602} = v_{402}/\omega_{403} \quad (2)$$

Where $v_{402}$ is the velocity and is the output of integrator 501. The angular velocities $\omega_{401}$ and $\omega_{403}$ are outputs of the BPF unit 401 and the BPF unit 403, respectively. $r_{601}$ and $r_{602}$ are a first coefficient and a second coefficient (rotational radius) calculated by the comparing unit 601 and the comparing unit 602, respectively.

The multiplying unit 701 receives the output signal of the integrator 502 and the output signal of the comparing unit 601 as input signals. The first shake correction amount is calculated by multiplying the input signals together. The multiplying unit 702 receives the output signal of the integrator 503 and the output signal of the comparing unit 602 as input signals. The second shake correction amount is calculated by multiplying the input signals together. The first shake correction amount is a translational shake amount in the x-axis direction caused by the rotational motion of the digital camera 100 around the y-axis. The second shake correction amount is a translational shake amount in the x-axis direction caused by the rotational motion of the digital camera 100 around the z-axis. The equation of the calculation performed by the multiplying unit 701 and the multiplying unit 702 is as follows.

$$x_{701} = r_{601} \times \theta_{502} \quad (3)$$

$$x_{702} = r_{602} \times \theta_{503} \quad (4)$$

Here, $x_{701}$ is the first shake correction amount, and $x_{702}$ is the second shake correction amount. $r_{601}$ and $r_{602}$ is the first coefficient and the second coefficient (rotational radius) calculated by the comparing unit 601 and the comparing unit 602, respectively. $\theta_{502}$ and $\theta_{503}$ are angles, and are outputs of the integrator 502 and the integrator 503, respectively.

An HPF unit 801 receives the first shake correction amount $x_{701}$ as an input signal, which is an output signal of the multiplying unit 701. The HPF unit 801 extracts a specific signal from the input signal by a high-pass filter and outputs the extracted signal. Specifically, the HPF unit 801 extracts a signal in frequencies over 1 Hz by a high-pass filter having a cut-off frequency of 1 Hz.

An LPF unit 802 receives the multiplying unit 702 as an input signal, which is an output signal of the second shake correction amount $x_{702}$. The LPF unit 802 extracts a specific signal from the input signal by a low-pass filter and outputs the extracted signal. Specifically, the LPF unit 802 extracts a signal in frequencies lower than 1 Hz by the low-pass filter (filter characteristic) having a cut-off frequency of 1 Hz.

As described above, in rotational motion around the y-axis, a shake having a high frequency is often the dominant factor of translational shake, and in rotational motion around the z-axis, a shake having a low frequency is often the dominant factor of translational shake. The HPF unit 801 and the LPF unit 802 can reduce an error factor in a shake calculation and improve the accuracy of a calculation of a shake amount by using filters that match the respective characteristics of the HPF unit 801 and the LPF unit 802.

A second shake correction amount calculation unit 5b receives the output signal of the HPF unit 801 and the output signal of the LPF unit 802 as input signals. The second shake correction amount calculation unit 5b calculates the shake correction amount in the x-axis direction by adding the input signals together.

In FIG. 3, an example in which an angular velocity meter is used as the angular velocity detection unit and an accelerometer is used as the acceleration detection unit has been described, but another detection method may be used. For example, the acceleration detection method includes a method of detecting acceleration based on vector information obtained from an image signal of the digital camera 100, a method of detecting acceleration by GPS, and the like. As an angular velocity detection method, there is a method of detecting an angular velocity from an image signal of the image capturing apparatus. In addition, although a filter is used to extract a signal of a specific band, the signal may be extracted by using a Fourier transform or the like.

In the calculation of the comparing unit 601 and the comparing unit 602, it is necessary that the inputted signal dimensions be aligned. That is, it is necessary to combine the angle and the position, the angular acceleration and the acceleration, and the angular velocity and the velocity. Therefore, when a sensor for detecting the speed rather than the acceleration is used as an acceleration detection unit 16x, the integrator 501 is unnecessary. An integrator or a differentiator may be used to adjust the dimensions to be the same.

Figure 4:
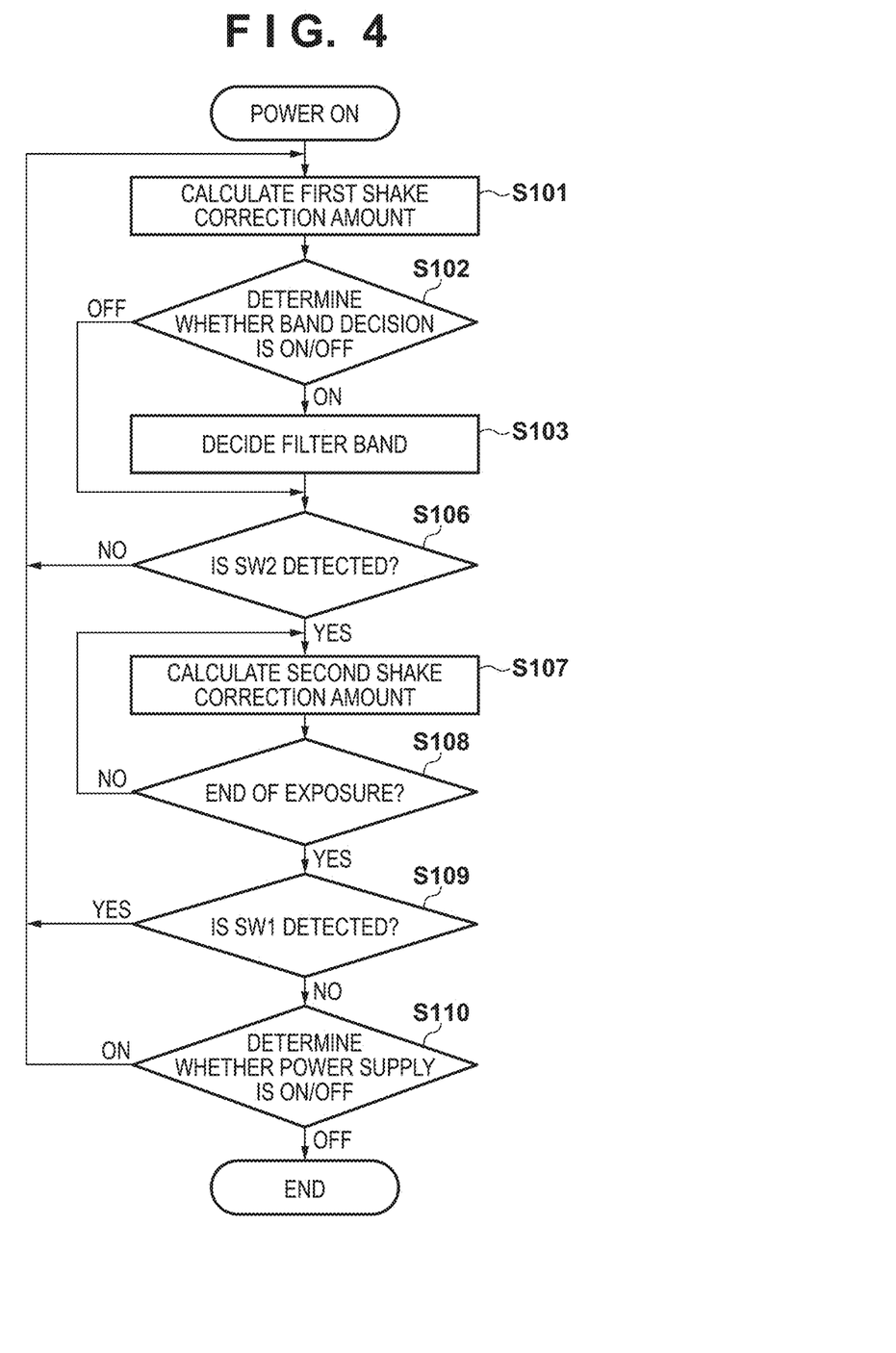
FIG. 4 is a flowchart illustrating an operation of a shake correction process in the digital camera 100.

FIG. 4 is a flowchart showing the operation of the shake correction process in the digital camera 100, and shows an example in which the band of the filter is determined. The flowchart of FIG. 4 starts when the power of the digital camera 100 is turned on. With the start of the flow, the shake correction unit 14 and the lens driving unit 13 start driving the image capturing element 6 and the image shake correction lens 9.

In step S101, the first shake correction amount calculation is performed. The first shake correction amount calculation is a calculation in which the shake correction amount is calculated in the blocks up to the multiplying units 701 and 702 in FIG. 3, and the obtained value is halved. A signal is sent to the shake correction unit 14 and the lens driving unit 13, and the image capturing element 6 and the image shake correction lens 9 are driven (driving before exposure), using the value obtained by the first shake correction amount calculation as the target movement amount. The shake correction amount is halved in order to secure a stroke of shake correction at the time of exposure.

In step S102, it is determined whether band decision is ON/OFF. When the band decision is OFF in step S102, the process proceeds to the following step S106 without proceeding to step S103. When the band decision is ON in step S102, the filter band decision process of step S103 is performed.

The camera system control unit 5 determines the band of the filter in step S103. The band of the filter decided here is applied to the HPF unit 801 and the LPF unit 802 in FIG. 3.

As described above, regarding the rotational axis of the rotational motion of the digital camera 100, since there is a characteristic for each axis, FIG. 3 shows a method of utilizing this fact. However, the relationship between the axes is not always like this, depending on the orientation change of the digital camera 100 or the orientation change of the user. A method of deciding the band of the filter according to the orientation of the digital camera 100 will be described.

The orientation of the digital camera 100 is detected by the orientation detection unit 19 in FIG. 1B, and the band of the filter is changed according to the orientation of the digital camera 100. An accelerometer, a distance sensor, or the like is used as the orientation detection unit 19. The accelerometer used as the acceleration detection unit 16 may be used as the orientation detection unit.

In FIGS. 2A-2C, examples of the digital camera 100 in an orientation (horizontal orientation) in which the x-axis is approximately horizontal are explained. In the case of an orientation (a vertical orientation) in which the x-axis is substantially perpendicular to the ground, since the positional relationship between the human body and the digital camera 100 changes, the dominant frequency that influences translational shake is switched between the rotational motion about an axis parallel to the x-axis and the rotational motion about an axis parallel to the y-axis. The dominant frequency of the translational shake of the rotational motion about an axis parallel to the z-axis is the same in both the vertical orientation and the horizontal orientation. For example, in rotational motion around an axis parallel to the y axis, since the motion is like that of an inverted pendulum with respect to the feet, a rotational motion with a low frequency mainly affects translational shake. Since, in the vertical orientation, rotational motion around an axis parallel to the x-axis is affected by a motion of twisting the human body, rotational motion having a higher frequency than the motion with respect to the feet mainly affects the translational shake. When the orientation of the digital camera 100 is the vertical orientation, the filters used for the rotational motion about the y-axis and the rotational motion about the x-axis are replaced with each other.

Next, a method of deciding the band of the filter according to a change in the orientation of the user will be described. In the above description, when considering the characteristics of each rotational axis of the rotational motion, it was assumed that the user is standing; however, the case where user is squatting or sitting can also be considered. In the case where the user is squatting, rotational motion of a higher band mainly influences the translational shake compared with the case where the user is standing. Therefore, the band of the filter is set higher. The orientation of the user is detected using the orientation detection unit 19. As described above, an acceleration sensor, a distance sensor, or the like can be used for the orientation detection unit 19. The orientation of the user is estimated by measuring the distance from the digital camera 100 to the ground with a distance sensor. Alternatively, the user may input the image capturing orientation using the operation detection unit 8. The approximate orientation can also be estimated from the first coefficient and the second coefficient.

Next, a method of deciding the band of the filter in accordance with an image capturing condition and an image capturing mode of the digital camera 100 will be described.

First, a case where the filter is changed in accordance with the shutter speed will be described. When the shutter speed is high, the influence of the low-frequency component of the shake is small, so that the band of the filter is increased. Conversely, when the shutter speed is low, the influence of the low-frequency component of the shake becomes large, and the influence of the high-frequency component becomes relatively small. Therefore, when the shutter speed is low, the band of the filter is lowered.

The band of the filter is also changed according to the image capturing mode. For example, when the image capturing mode is a mode for capturing a starry sky, the shutter speed is reduced, and thus the band of the filter is lowered. The band of the filter is changed by the camera system control unit 5.

Returning to the explanation of FIG. 4, in step S106, it is determined whether or not it is detected that the switch SW2 is turned on. If it is not detected that the switch SW2 is turned on, the process returns to step S101. When it is detected in step S106 that the switch SW2 is turned on, the second shake correction amount calculation is performed in step S107. When it is detected that the switch SW2 is turned on, the driving of the image capturing element 6 and the image shake correction lens 9 is switched to the driving during exposure, which is performed based on the result of the second shake correction amount calculation. In the pre-exposure driving, a value obtained by halving the calculated shake correction amount is used, but in driving during exposure, the calculated shake correction amount itself is used. The calculation result in the second shake correction amount calculation is the calculation result of the second shake correction amount calculation unit 5b in FIG. 3.

Step S107 is repeated until the end of exposure is confirmed in step S108, and when the end of exposure is confirmed in step S108, it is determined whether the switch SW1 is ON/OFF in step S109. If it is confirmed in step S109 that the switch SW1 is turned on, there is a possibility that image capturing may still be performed, and therefore the process returns to step S101. If it is not confirmed that the switch SW1 is turned on in step S109, the process advances to step S110.

In step S10, it is determined whether the power supply is ON/OFF and when the power supply is confirmed to be ON, the process returns to step S101. When it is confirmed that the power is OFF in step S110, the flow ends.

The filter band of step S103 may be decided in real time at the time of the second shake correction calculation of step S107.

As described above, according to the above-described embodiment, by performing correction taking into consideration the dominant frequency band for each detection axis for translational shake, it is possible to perform shake correction with high accuracy.

In the above embodiment, after the first shake correction amount $x_{701}$ and the second shake correction amount $x_{702}$ are acquired by the first shake correction amount calculation unit 5a, the HPF unit 801 and the LPF unit 802 extract signals of specific frequencies to calculate the shake correction amount in the x-axis direction. However, the present invention is not limited to acquiring a correction amount (correction amount in the x-axis direction) used for camera shake correction by extracting a signal of a specific frequency after acquiring each shake correction amount. Among the shake components detected by the first and second shake detection units, the shake correction amount used for camera shake correction may be acquired based on shake correction amount based on a specific frequency signal and the shake correction amount based on another specific frequency component among shake components detected by the first and third shake detection units.

For example, the first shake correction amount may be acquired based on a signal acquired by multiplying the output of the accelerometer 16x and an angular velocity meter 15ya by BPF and LPF, respectively, and the second shake correction amount may be acquired based on a signal acquired by multiplying the output of the accelerometer 16x and the angular velocity meter 15ro by BPF and HPF, respectively, and the first and second shake correction amounts may then be added. In the present invention and the present specification, a shake correction amount acquired by acquiring a shake correction amount as in the embodiment and then extracting a signal of a specific frequency band, and a correction amount acquired from a shake detection signal acquired by extracting a signal of a specific frequency band are each referred to as a shake correction amount based on a signal of a specific frequency band among the output signals of a shake detection unit.

In the above description, the digital camera 100 has been described as a so-called mirrorless single-lens camera, but the present invention is applicable to various optical apparatuses such as a compact digital camera, a digital single-lens reflex camera, a digital video camera, an action camera, and a cellular phone.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-057087, filed Mar. 25, 2019 which is hereby incorporated by reference herein in its entirety.

What is claimed is:

1. A stabilization control apparatus comprising:
at least one processor or circuit configured to function as
a first shake detection unit configured to detect a translation component of a shake in a first axial direction;
a second shake detection unit configured to detect a rotational component of a shake about a second axis perpendicular to the first axis;
a third shake detection unit configured to detect a rotational component of a shake about a third axis perpendicular to the first axis and the second axis;
a first acquisition unit configured to acquire a first translational shake amount in the first axial direction based on a signal in a first frequency band from an output signal of the first shake detection unit and a signal in the first frequency band from an output signal of the second shake detection unit, and acquire a second translational shake amount in the first axial direction based on a signal in a second frequency band from an output signal of the first shake detection unit and a signal in the second frequency band from an output signal of the third shake detection unit; and
a second acquisition unit configured to acquire a third translational shake amount in the first axial direction using the first translational shake amount and the second translational shake amount.

2. The apparatus according to claim 1, wherein the first acquisition unit obtains a rotation radius of a first shake by dividing a signal obtained by integrating an output signal of the first shake detection unit by an output signal of the second shake detection unit, and obtains a rotation radius of a second shake by dividing a signal obtained by integrating an output signal of the first shake detection unit by an output signal of the third shake detection unit.

3. The apparatus according to claim 2, wherein the first acquisition unit acquires the first translational shake amount by multiplying a signal, obtained by integrating the output signal of the second detecting unit, with the rotation radius of the first shake.

4. The apparatus according to claim 2, wherein the first acquisition unit acquires the second translational shake amount by multiplying a signal, obtained by integrating the output signal of the third detecting unit, with the rotation radius of the second shake.

5. The apparatus according to claim 1, wherein the second acquisition unit acquires the third translational shake amount in the first axial direction by adding the first translational shake amount and the second translational shake amount.

6. The apparatus according to claim 1, wherein the second and third shake detection units include an angular velocity meter.

7. The apparatus according to claim 1, wherein the first shake detection unit includes an accelerometer.

8. The apparatus according to claim 1, further comprising an image capturing device configured to generate an image signal, wherein the first shake detection unit detects the translation component of the shake in the first axial direction from the image signal.

9. The apparatus according to claim 1, wherein
the first acquisition unit comprises a first extraction unit and a second extraction unit, wherein
the first extraction unit acquires the first translational shake amount by extracting a signal in the first frequency band from a shake amount acquired using an output signal of the first shake detection unit and an output signal of the second shake detection unit, and
the second extraction unit acquires the second translational shake amount by extracting a signal in the second frequency band from the shake amount acquired using the output signal of the first shake detection unit and the output signal of the third shake detection unit.

10. The apparatus according to claim 9, wherein the first extraction unit and the second extraction unit are filters.

11. The apparatus according to claim 10, wherein the first extraction unit and the second extraction unit have filter characteristics corresponding to characteristics of the signals of the second and third shake detection units.

12. The apparatus according to claim 11, wherein the at least one processor or circuit is configured to further function as
a control unit configured to modify the filter characteristics of the first and second extraction units.

13. The apparatus according to claim 12, further comprising an image capturing device configured to generate image signals, wherein the control unit changes the filter characteristics according to an image capturing condition and the image capturing device.

14. The apparatus according to claim 13, wherein the image capturing condition is a shutter speed.

15. The apparatus according to claim 13, further comprising an orientation detection unit configured to detect an orientation of the image capturing apparatus, wherein the image capturing condition is the orientation of image capturing apparatus.

16. The apparatus according to claim 13, wherein the image capturing condition is a condition as to whether or not a mode for capturing a starry sky is set.

17. The apparatus according to claim 1, wherein the third axis is parallel to an optical axis of an image capturing optical system.

18. The apparatus according to claim 17, wherein the second frequency band is lower than the first frequency band.

19. The apparatus according to claim 1, wherein the first frequency band and the second frequency band are different.

20. The apparatus according to claim 1, wherein a shake correction device is controlled based on the third translational shake amount in the first axial direction.

21. A control method of a stabilization control apparatus, comprising:
performing a first shake detection of detecting a translation component of a shake in a first axial direction;
performing a second shake detection of detecting a rotational component of a shake about a second axis perpendicular to the first axis;
performing a third shake detection of detecting a rotational component of a shake about a third axis perpendicular to the first axis and the second axis;
performing a first acquisition of acquiring a first translational shake amount in the first axial direction based on a signal in a first frequency band from an output signal of the first shake detection and a signal in the first frequency band from an output signal of the second shake detection, and acquiring a second translational shake amount based on a signal in a second frequency band from an output signal of the first shake detection and a signal in the second frequency band from an output signal of the third shake detection; and
performing a second acquisition of acquiring a third translational shake amount in the first axial direction using the first translational shake amount and the second translational shake amount.

22. A non-transitory computer readable storage medium storing a program for causing a computer to execute each step of a method for controlling a stabilization control apparatus, the method comprising:
performing a first shake detection of detecting a translation component of a shake in a first axial direction;
performing a second shake detection of detecting a rotational component of a shake about a second axis perpendicular to the first axis;
performing a third shake detection of detecting a rotational component of a shake about a third axis perpendicular to the first axis and the second axis;
performing a first acquisition of acquiring a first translational shake amount in the first axial direction based on a signal in a first frequency band from an output signal of the first shake detection and a signal in the first frequency band from an output signal of the second shake detection, and acquiring a second translational shake amount based on a signal in a second frequency band from an output signal of the first shake detection and a signal in the second frequency band from an output signal of the third shake detection; and
performing a second acquisition of acquiring a third translational shake amount in the first axial direction using the first translational shake amount and the second translational shake amount.

\* \* \* \* \*